(12) United States Patent
Akkar et al.

(10) Patent No.: US 7,826,610 B2
(45) Date of Patent: Nov. 2, 2010

(54) METHOD TO SECURE AN ELECTRONIC ASSEMBLY AGAINST ATTACKS BY ERROR INTRODUCTION

(75) Inventors: Mehdi-Laurent Akkar, Gentilly (FR); Louis Goubin, Paris (FR)

(73) Assignee: Gemalto SA, Meudon (FR)

( * ) Notice: Subject to any disclaimer, the term of this patent is extended or adjusted under 35 U.S.C. 154(b) by 1062 days.

(21) Appl. No.: 10/520,806

(22) PCT Filed: Jul. 7, 2003

(86) PCT No.: PCT/IB03/03120

§ 371 (c)(1), (2), (4) Date: Jan. 10, 2005

(87) PCT Pub. No.: WO2004/006074

PCT Pub. Date: Jan. 15, 2004

(65) Prior Publication Data

US 2008/0130869 A1    Jun. 5, 2008

(30) Foreign Application Priority Data

Jul. 9, 2002 (EP) .................... 02291728

(51) Int. Cl.
*H04K 3/00* (2006.01)
*H04K 1/00* (2006.01)

(52) U.S. Cl. ............... 380/28; 380/1; 380/252; 713/189; 713/194

(58) Field of Classification Search ............ 726/22, 726/26; 713/189–194; 380/1, 252–254, 380/28–30
See application file for complete search history.

(56) References Cited

U.S. PATENT DOCUMENTS

| 6,539,092 B1 * | 3/2003 | Kocher ............... 380/252 |
| 6,658,569 B1 * | 12/2003 | Patarin et al. ........ 713/194 |
| 6,832,316 B1 * | 12/2004 | Sibert ............... 713/181 |
| 2002/0003876 A1 * | 1/2002 | Lim ................. 380/29 |
| 2002/0101986 A1 * | 8/2002 | Roelse .............. 380/42 |
| 2005/0021990 A1 * | 1/2005 | Liardet et al. ........ 713/194 |

FOREIGN PATENT DOCUMENTS

JP    02-252027 A    9/1990

OTHER PUBLICATIONS

Borst, Johan et al. "Cryptography on Smart Cards." Computer Networks, 2001, pp. 423-435.*
Cheng, D.Y. "'Defensive Programming' in the Rapid Development of a Parallelscientific Program," Jun. 1990, pp. 665-669.*

(Continued)

*Primary Examiner*—Kimyen Vu
*Assistant Examiner*—Darren Schwartz
(74) *Attorney, Agent, or Firm*—Pehr B. Jansson; The Jansson Firm

(57) ABSTRACT

The invention concerns a method to secure an electronic assembly implementing any algorithm against attacks by error introduction. The method according to the invention consists in performing an additional calculation using a verification function on at least one intermediate result in order to obtain a calculation signature and in performing a least once more all or part of the calculation in order to recalculate said signature and compare them in order to detect a possible error.

10 Claims, 1 Drawing Sheet

OTHER PUBLICATIONS

Hein, James L. "Discrete Mathematics," 1996, Jones and Barlett Publishers Inc, pp. 91-95.*

Borst J. et al: "Cryptography on smart cards" Computer Networks, Elsevier Science Publishers B. V., Amsterdam, NL, vol. 36, No. 4, (Jul. 16, 2001), pp. 423-425, XP004304907 ISSN: 1389-1286 p. 429, right-hand colums -p. 430, left-hand colums p. 431, right-hand colums, line 8.

Karri R, et al: "Concurrent Error Detection of Fault-Based Sidechannel Cryptanalysis of 128-Bit Symmetric Block Ciphers" Proceedings of the 38th. Annual Design Automation Conference. (DAC). Las Vegas, NV, Jun. 18-22, 2001, Proceedings of the Design Automation Conference, New York, NY: ACM, US, vol. CONF. 38, (Jun. 18, 2001), pp. 579-584, XP002190412 ISBN: 1-58113-297-2 p. 579, right-hand column, paragraph 2-p. 581, left-hand column, paragraph 2 p. 581, right-hand column, paragraph 3-p. 583, right-hand column, paragraph 1.

Menezes, Oorschot, Vanstone: "handbook of applied cryptography, Passage" Handbook of Applied Cryptography, CRC Press Series on Discrete Mathematics and its applications, CRC Press, 1997, pp. 334-335, XP002239694 Boca Raton, FL, USA ISBN: 0-8493-8523-7 p. 334, paragraph 9.28.-p. 335, paragraph 9.32.

* cited by examiner

METHOD TO SECURE AN ELECTRONIC ASSEMBLY AGAINST ATTACKS BY ERROR INTRODUCTION

This invention concerns a method to secure an electronic assembly implementing any algorithm where a check must be carried out to ensure that the algorithm was executed correctly, whether for the intermediate steps or for the intermediate data. More precisely, the purpose of the method is to produce a version of the algorithm which is not vulnerable to certain types of attack through introduction of one or more errors—known as Differential Fault Analysis or Extended Fault Analysis—which attempt to obtain information about one or more data items or operations involved in the algorithm calculation by studying the calculation procedure of the electronic assembly when one or more errors are introduced.

TECHNICAL FIELD

The algorithms considered in the remainder of the document are given as non-limiting examples of cryptographic algorithms using a secret key to calculate output information according to input information; it may concern an encryption, decryption, signature, signature check, authentication or non-repudiation operation. They are built so that an attacker, knowing the inputs and the outputs, is unable in practice to deduce any information concerning the secret key itself.

However, this invention covers those algorithms where tests must be carried out to ensure that all intermediate steps and data involved in the calculation are free from errors.

The first time attacks using error introduction appeared dates back to 1996:
Ref (0): New Threat Model Breaks Crypto Codes—D. Boneh, R. DeMillo, R. Lipton—Bellcore Press Release
An example of this type of attack on the cryptographic algorithm with DES secret key —ref (1)— can be found in article —ref (2)— published by Eli Biham and Adi Shamir in 1996.
Ref (1): FIPS PUB 46-2, Data Encryption Standard, 1994
Ref (2): A New Cryptanalytic Attack on DES, Draft The invention proposed also concerns extended attacks such as those where the attacker uses the fact that certain functions have an output which is smaller than the input; there are several inputs which give the same output. Consequently, by modifying the input, a correct result can still be obtained at the output, which is sometimes interesting.

The purpose of the method according to this invention is to eliminate the risks of DFA attacks on electronic assemblies or systems by modifying the functions involved in the calculation.

Another purpose of this invention is to modify a cryptographic calculation process implemented by cryptography electronic assemblies protected so that the above-mentioned basic assumption is no longer satisfied, i.e. no intermediate variable or function where an error could be introduced remains undetected by the system.

SUMMARY OF THE INVENTION

This invention concerns a method to secure the execution of a program in an electronic assembly comprising information processing means and information storage means, characterised in that it consists in performing an additional calculation by a verification function on at least one intermediate result in order to obtain a calculation signature.

This invention also concerns an electronic assembly and for example a smart card and a program used to implement said method.

BRIEF DESCRIPTION OF THE DRAWINGS

Other purposes, features and advantages of the invention will appear on reading the description which follows of the implementation of the method according to the invention and of a mode of realisation of an electronic assembly designed for this implementation, given as a non-limiting example, and referring to the attached drawings in which.

WAY OF REALISING THE INVENTION

The purpose of the method according to the invention is to secure an electronic assembly and for example an onboard system such as a smart card implementing a cryptographic calculation process using a secret key. The electronic assembly includes information processing means such as a processor and information storage means such as a memory. The cryptographic calculation process is installed in the memory, for example ROM type, of said assembly. The processor of said system executes the calculation process by using a secret key, stored in a secret area of a memory, EEPROM type for example.

Figure 1:
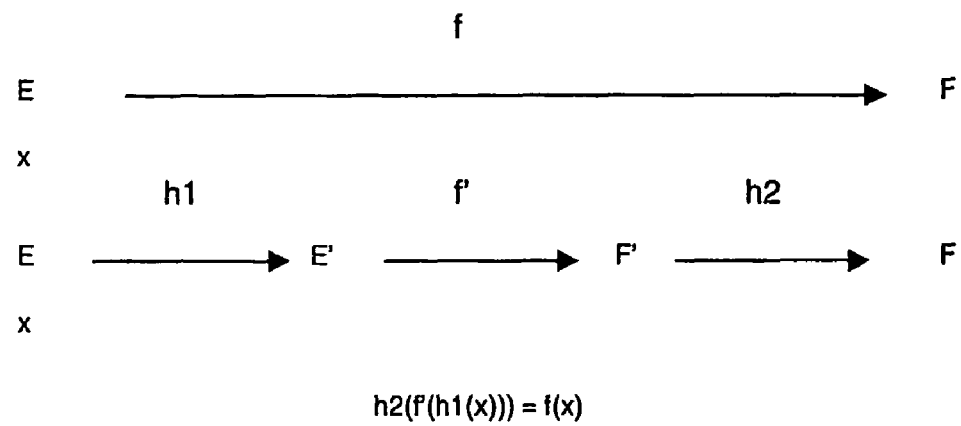
FIGS. 1 and 2 are a diagrammatic representation of a mode of realisation of the method according to this invention.
Figure 2:
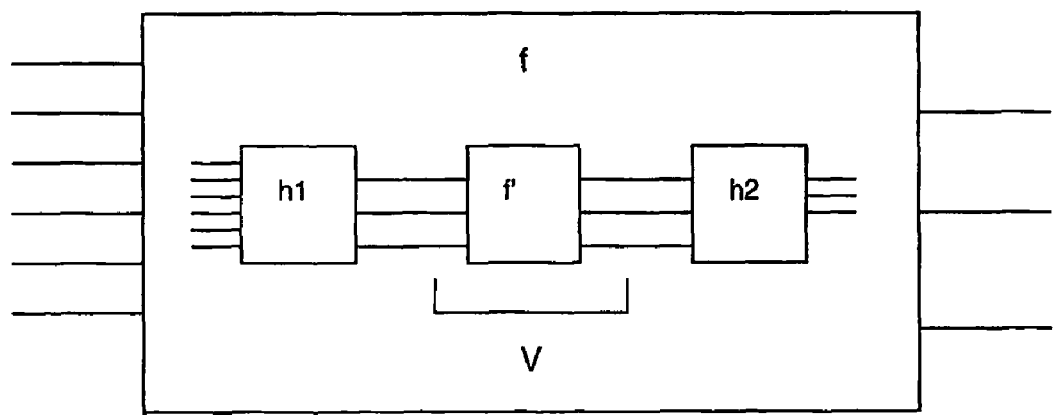

The method to secure said electronic assembly implementing a traditional calculation process which must be error free, subject of this invention and illustrated on FIGS. 1 and 2, is remarkable in that the functions f implemented in the calculation are modified by more general functions f' (known as "super-functions") but where it is easy to find the normal result of the function f. Any error introduced in the calculation will be detected by a verification function V associated with the "super-function". These super-functions f' and verification functions V will obviously be described below and numerous examples will also be given.

The principle of super-function f' according to this invention is described below, referring to FIGS. 1 and 2. An algorithm executed by an electronic device is always a series of elementary operations. We will describe here the principle of super-function on one of these elementary operations. Any elementary operation can be described as a function f of a finite set E to a finite set F (FIG. 2). The principle of the super-function is to consider a super-function f of E' to F' where:

E' is a set such that there exist a one-to-one mapping $h_1$ of E in E' (i.e. if we take two different elements in E, their images by $h_1$ are also different in E'). In practice, this is the same as saying that E' has at least as many elements as E.

F' is a set such that there exist an onto mapping $h_2$ of F' in F (i.e. for all elements y of F there exist x elements of F' such that $h_2(x)=y$). In practice, this is the same as saying that F' has at least as many elements as F.

And in particular, for any element x of E, the following equality must be true: $h_2(f'(h_1(x)))=f(x)$. This is the same as saying that the function f can be calculated by using the calculation of the function f' and by the super-sets E' and F'.

Error detection is carried out by a verification function V. A verification function is one used to check the intermediate results (or those considered to be critical) of an algorithm.

Formally, if we write:
B={0,1}* the set of binary words.
$E=\{x_i\}_{0<i<n+1}$ where the elements $x_i$ are in practice elements of B, the set of n intermediate results that we want to protect.

A verification function V is a function which associates a binary word of fixed length N with every element of E: V: E→$\{0,1\}^N$ In practice, in more concrete terms:
V is a function which associates a calculation "signature" with a set of intermediate values; by repeating this calculation, this signature will be used to detect a possible error.

We can clearly see that in practice N will be of the order of 8, 32 or 64 (usual size in computing) and that since the set of values to be protected is larger, the verification function cannot be one-to-one. Consequently, different calculations could give similar results by V (this property will be called collision in the remainder of the document). V must therefore be chosen so that the collisions are as infrequent as possible and well distributed.

The security principle according to this invention consists in combining the two methods previously described: firstly the principle of super-function is applied, in order to protect the functions individually, then a verification function. This produces a calculation signature. All or part of the calculation can now be repeated one or more times in order to recalculate a new signature, then the signatures are compared in order to detect any errors. The verification function performs a calculation on at least one intermediate result from an operation of the calculation process or of a super-function. An intermediate result is a result obtained during execution of a cryptographic calculation process, as opposed to the final result. As an illustration, according to a special form of realisation, it is recommended to apply one or more verification functions on intermediate results obtained at sensitive points during execution of the algorithm considered.

A first example of applying the security method according to this invention to the DES algorithm is given below.

Concerning the super-functions, only one is used in order to protect the S-boxes. The S-boxes have indeed one 6-bit input and one 4-bit output. Several 6-bit values may therefore give the same result on 4 bits, which an attacker can use. In the present case:

$E=\{0,1\}^6$ and $F=\{0,1\}^4$

We then introduce
$E'=E$ and $h_1$ identity function
$F'=\{0,1\}^6$ and $h_2$ which simply consists of removing the most significant bit and the least significant bit of a word of F.

f' is built as follows: if x is an element of E' (therefore on 6 bits), the first bit and the last bit of f' (x) are those of x; the four bits in the middle are those given by the usual result of the boxes. A brief analysis of the operating mode used with the S boxes shows that for all elements of E we have: $h_2(f'(h_1(x)))$=S-box(x). Concerning the verification function, it is first used on the results output from each round (64 bits) and on the concatenated outputs of the function f' (48 bits which will be considered as 64).

The verification function as such must then be chosen: several examples are given below.

We write in the remainder of the document $X=\{x_i\}_{0<i<n+1}$ the set of values to be checked and V the verification function. The intermediate verification value taking into account the first j values $x_i$ is sometimes written $V_j$. We therefore have $V(x)=V_n$ A first example of verification function is the concatenation of values: this means that a trace is kept throughout the calculation, which is costly in terms of memory but which is efficient since there is no risk of collision.

$V_{j+1}=V_j\|x_{j+1}$

A second example is the exclusive or of the values:

$V(x_1,\ldots,x_n)=x_1 XOR \ldots XOR x_n$

A third example is addition modulo $2^N$ (N is the length of the result). This is the same as adding the intermediate results and truncating the result at the required length:

$V_{j+1}=(V_j+x_{j+1})$ modulo $2^N$

A fourth example is the usual CRC of the values:

$V(x_1,\ldots,x_n)=CRC(x_1,\ldots,x_n)$

A fifth example is the exclusive or of the values where a cyclic shift is carried out on the intermediate result of a random number of bits (e.g. 1):

$V_{j+1}=(V_j<<1) XOR x_{j+1}$

A sixth example is the exclusive or of the values with multiplication. At each step, an XOR is carried out on the intermediate verification value with the product of the truncated intermediate verification value and the current $x_i$.

$V_{j+1}=V_j XOR((V_j x x_{j+1})$ modulo $2^N)$

A seventh example is data hashing by a cryptographic function. For example, all the values can be concatenated, hashed using the SHA-1 function and the required number of bits of the result can be kept.

$V=SHA-1(X)$

A second example of applying the security method according to this invention to the RSA algorithm is given below, in which the following loop, using variables M,C1,C2,N, and a bit string D, is sometimes executed.

C1=1

For i=0 to N do:
   C2=C1×C1
   C1=C2×M
   If bit i of D=0 then
      C1=C2
   End If.

End loop.

Output the result C1.

We can see that if the attacker modifies for example C1 before the "If" and if the If instruction is executed, the result is correct: the attacker can therefore obtain information concerning the value of D.

No super-functions are used in this case; application of a simple exclusive or on the intermediate values C1 and C2 will detect any errors.

Sometimes, the attacker does not control the error introduction fully. By working on a larger space and by checking the consistency of the results, an error introduced can therefore be detected since it generates an impossible result. For example, if two eight-bit numbers are added and the result is stored on 16 bits, an error introduced on the result has a strong chance of affecting the 7 most significant bits (generally 0 using the laws of arithmetic) which means that the error will be detected.

The invention claimed is:

1. A method to secure an electronic assembly having a processor and a storage means implementing a calculation process that calculates the result of a calculation that includes an elementary operation f(x) of a cryptography algorithm without performing the calculation f(x) thereby avoiding analysis of the operation of the electronic assembly using knowledge of the calculation f(x), the method comprising:

operating the processor of the electronic assembly according to instructions stored in the storage means to perform an additional calculation by a verification function on at least one intermediate result in order to obtain a calculation signature;

operating the processor of the electronic assembly according to instructions stored in the storage means to obtain the result of the elementary operation f(x) by performing a modified calculation in lieu of the elementary operation f(x) using a super-function operation acting from and/or to a larger set wherein a super-function f' of a function f is defined as a function f' such that $h_2(f'(h_1(x)))=f(x)$ wherein $h_1$ is only a one-to-one mapping between a set E and a set E' and $h_2$ is only an onto mapping of a set F' in a set F, wherein x is a member of E and f(x) is a member of the set F; and operating the processor of the electronic assembly according to instructions stored in the storage means to perform an additional calculation by the verification function using the result obtained by the super function in order to obtain the calculation signature.

2. The method according to claim 1, wherein the method further comprises:

operating the processor of the electronic assembly according to instructions stored in the storage means to perform at least once more all or part of the calculation in order to recalculate said signature and compare them in order to detect a possible error.

3. The method according to claim 1, wherein the calculation of the elementary operation can be recomputed using the calculation of the super-function.

4. The method according to claim 1, further comprising operating the processor of the electronic assembly according to instructions stored in the storage means to move from E to E' by one-to-one function $h_1$; and move from F' to F by onto function $h_2$;

wherein $h_1$ and $h_2$ are mappings such that for any element x of E the following equality is true: $h_2(f'(h_1(x)))=f(x)$.

5. An electronic assembly secured from differential attack and comprising a calculation process processor that includes performing a calculation that includes an elementary operation f(x) of a cryptography algorithm, wherein the electronic assembly comprises storage means for storing instructions to cause the calculation processing means to execute a verification function used to perform an additional calculation on intermediate results in order to obtain a calculation signature thereby securing the electronic assembly from differential attack;

and wherein the calculation process comprises:

operating the calculation processing means of the electronic assembly according to instructions stored in the storage means to perform an additional calculation by a verification function on at least one intermediate result in order to obtain a calculation signature;

operating the processor of the electronic assembly according to instructions stored in the storage means to obtain the result of the elementary operation f(x) by performing a modified calculation of the elementary operation f(x) using a super-function operation acting from and/or to a larger set wherein a function f' of a function f is defined as a function f' such that $h_2(f'(h_1(x)))=f(x)$ wherein $h_1$ is only a one-to-one mapping between a set E and a set E' and $h_2$ is only an onto mapping of a set F' and a set F wherein x is a member of E and f(x) is a member of the set F; and operating the processor of the electronic assembly according to instructions stored in the storage means to perform an additional calculation to obtain the result of the elementary operation f(x) by the verification function using the result obtained by the super function in order to obtain the calculation signature.

6. A smart card comprising storage means of a calculation process, processing means of said process, wherein the smart card includes storage means storing instructions implementing a calculation process that calculates the result of a calculation that includes an elementary operation f(x) of a cryptography algorithm without performing the calculation f(x) thereby avoiding analysis of the operation of the electronic assembly using knowledge of the calculation f(x) and implementing a verification function used to perform an additional calculation on an intermediate result in order to obtain a calculation signature; and wherein the calculation process comprises:

operating the processor of the electronic assembly according to instructions stored in the storage means to perform an additional calculation by a verification function on at least one intermediate result in order to obtain a calculation signature;

operating the processor of the electronic assembly according to instructions stored in the storage means to obtain the result of the elementary operation f(x) by performing a modified calculation of the elementary operation f(x) using a super-function operation acting from and/or to a larger set wherein a super-function f' of a function f is defined as a function f' such that $h_2(f'(h_1(x)))=f(x)$ wherein $h_1$ is only a one-to-one mapping between a set E and a set E' and $h_2$ is only an onto mapping of a set F' and a set F wherein x is a member of E and f(x) is a member of the set F; and operating the processor of the electronic assembly according to instructions stored in the storage means to perform an additional calculation by the verification function using the result obtained by the super function in order to obtain the calculation signature.

7. The method according to claim 2, wherein the calculation of the elementary operation can be recomputed using the calculation of the super-function.

8. The method according to claim 1, wherein the elementary operation f(x) is a substitution function of a DES cryptography algorithm.

9. The electronic assembly according to claim 5, wherein the elementary operation f(x) is a substitution function of a DES cryptography algorithm.

10. The smart card according to claim 1, wherein the elementary operation f(x) is a substitution function of a DES cryptography algorithm.

* * * * *